Figures 1, 9:
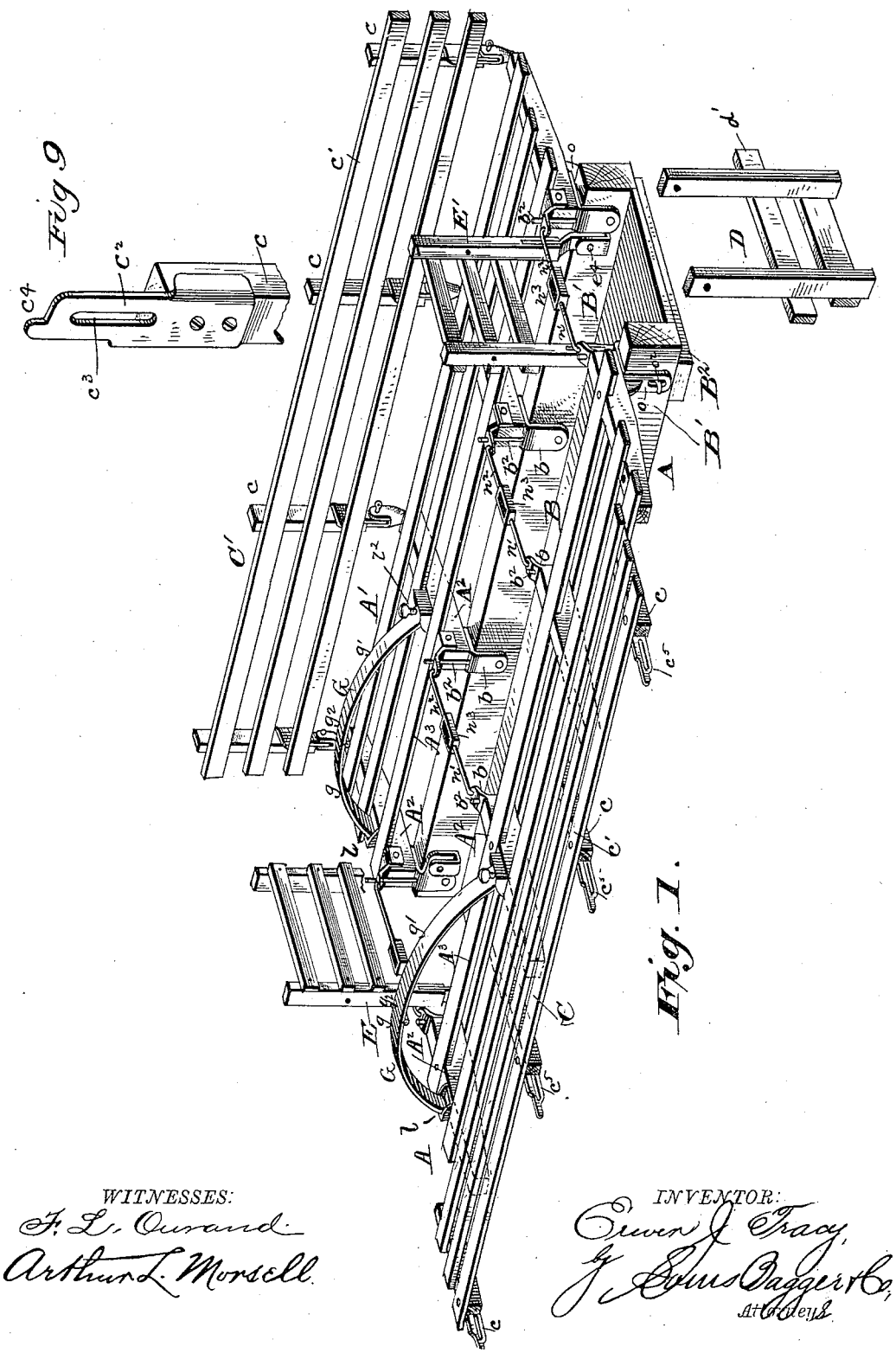

(No Model.) 3 Sheets—Sheet 1.

E. J. TRACY.
FOLDING RACK.

No. 459,847. Patented Sept. 22, 1891.

WITNESSES:
F. L. Ourand
Arthur L. Morsell

INVENTOR:
Erwin J. Tracy,
J. Evans Daggett & Co.,
Attorneys (No Model.) 3 Sheets—Sheet 2.
E. J. TRACY.
FOLDING RACK.
No. 459,847. Patented Sept. 22, 1891.
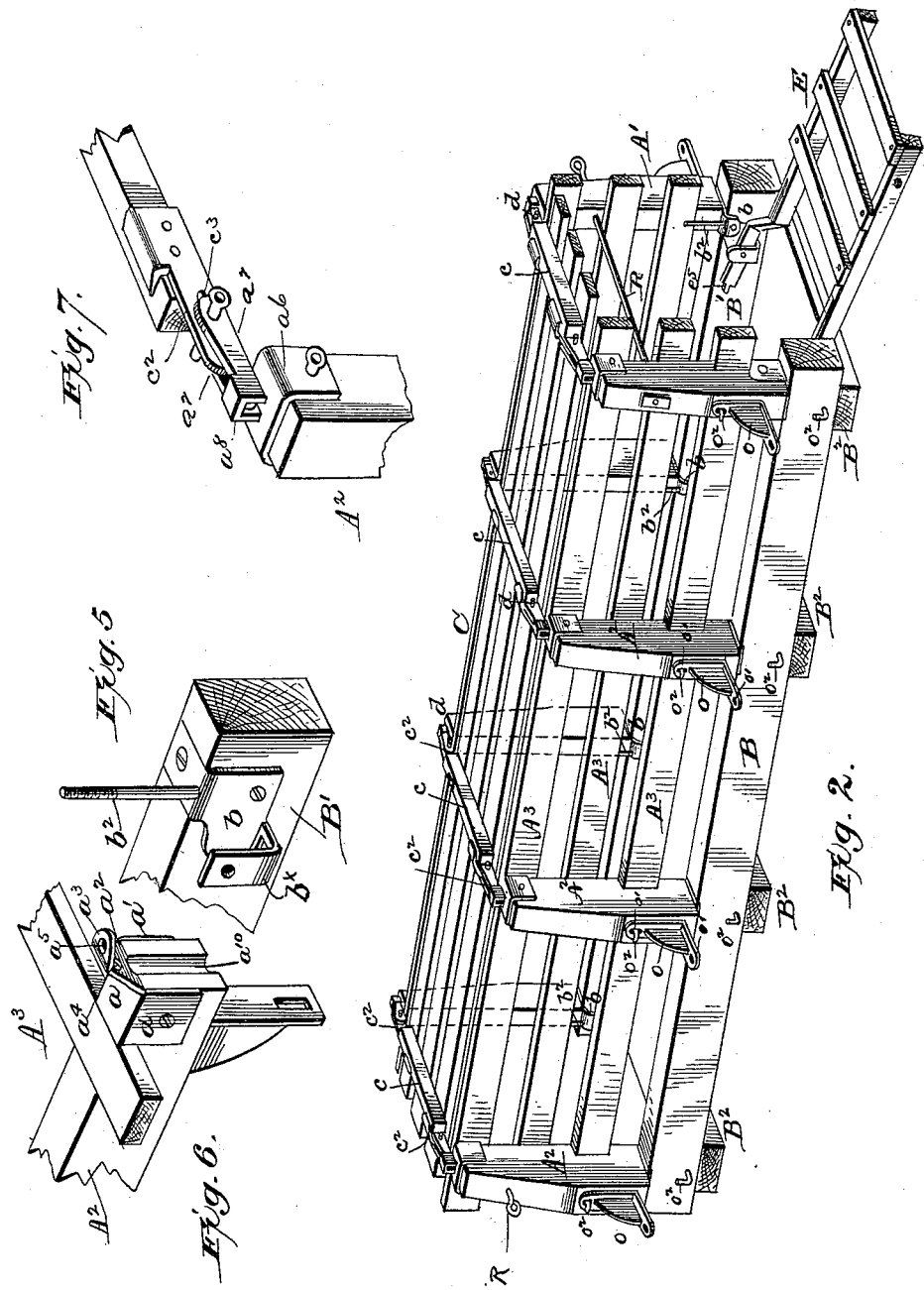
WITNESSES:
F. L. Durand.
Arthur L. Morsell.
INVENTOR:
Erwin J. Tracy,
By Davis Pagger & Co.,
Attorneys.

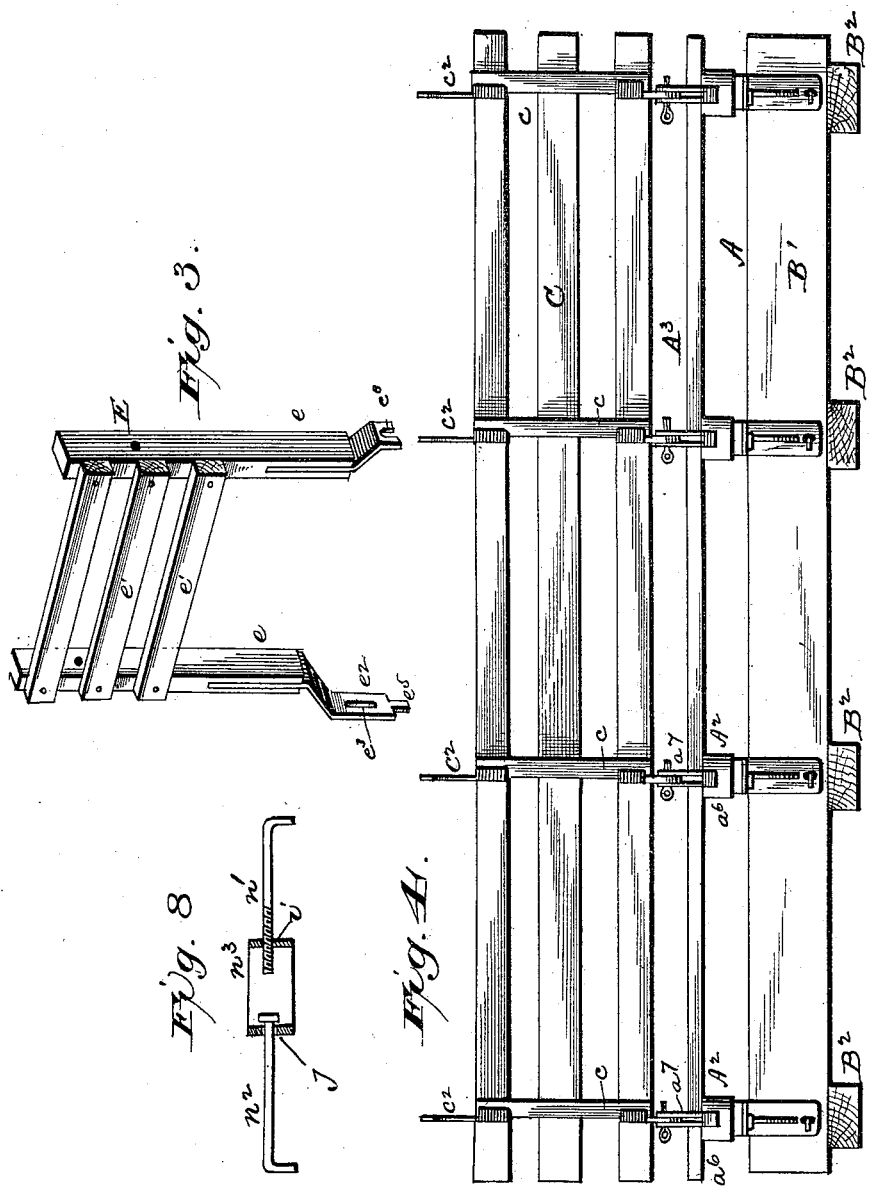

UNITED STATES PATENT OFFICE.

ERWIN J. TRACY, OF SIOUX FALLS, SOUTH DAKOTA.

FOLDING RACK.

SPECIFICATION forming part of Letters Patent No. 459,847, dated September 22, 1891.

Application filed May 12, 1890. Renewed February 24, 1891. Serial No. 382,539. (No model.)

*To all whom it may concern:*

Be it known that I, ERWIN J. TRACY, a citizen of the United States, and a resident of Sioux Falls, in the county of Minnehaha and State of South Dakota, have invented certain new and useful Improvements in Folding Racks; and I do hereby declare that the following is a full, clear, and exact description of the invention, which will enable others skilled in the art to which it appertains to make and use the same, reference being had to the accompanying drawings, which form a part of this specification.

My invention relates to a combined hay-rack and stock-rack; and the objects of my improvements are to provide a hay-rack which is readily convertible from a hay-rack to a stock rack or cage for transporting hogs, sheep, calves, &c., and one which can be easily removed from the wagon by one man and which when in use as a hay-rack is especially adapted to enable one man to put on the wagon a good-sized load of hay or grain from the ground without the help of a second person to "load" the hay or grain.

My invention consists in the construction and combination of parts, as hereinafter more fully described, and particularly pointed out in the claims at the end of the specification.

Referring to the drawings accompanying the specification, Figure 1 represents a perspective view of the rack extended for use as a hay-rack, with one of the wings in vertical position and the other in horizontal position, and showing the additional gate-piece in detail. Fig. 2 is a perspective view of the rack when folded for use as a stock-cage, with one of the rear end gates or ladders shown turned down. Fig. 3 is a detail view of one of the end ladders. Fig. 4 is a side elevation of the hay-rack with the side wing in vertical position, looking from the left-hand side. Figs. 5 to 9 show detail views, to be more particularly referred to hereinafter.

Like letters of reference indicate like parts in all the figures.

My rack comprises the box or body portion B, the two side frames A A', the two wings C C', and the front and end ladders E E'. The box B comprises the side pieces B' B', the bottom cross-bars $B^2$ $B^2$, and the boards forming the bottom of the box. It will be understood that the box B rests upon the wagon in the same manner as the ordinary wagon box or body. Each of the side frames A A' comprises the cross-pieces $A^2$ and the rails or boards $A^3$. Each of the wings C C' comprises the cross-pieces $c$ and the rails or boards $c'$. The frames A and A' are each exactly alike. The wings C and C' are alike, except that the wing C, which forms the top of the stock-cage, has means at each end of its cross-pieces for connecting such wing to the side frames, while the wing C', which is only used with the hay-rack, has connecting means at only one end of each of its cross-pieces.

The means for securing each of the side frames A A' to the box B being exactly alike, a description of one will answer for both. $b$ $b$ represent castings of the shape shown in Fig. 5, secured to the side piece B' near each end thereof, and at points intermediate the ends there will be as many of these castings $b$ as there are cross-pieces $A^2$ on the side frames A A'. These castings each have a pin or bolt $b^2$ projecting upwardly from the top of the side piece B' for a purpose explained farther on. At the inner or lower end of each of the cross-pieces $A^2$ is attached a casting $a$ of the shape shown in Fig. 6, the flanges $a'$ $a'$ thereof fitting over the cross-pieces $A^2$. The castings $a$ are formed with the bend or shoulder $a^2$ and the lip or extension $a^3$. $a^4$ represents a hole through the casting at the bend $a^2$ for the passage of the pin or bolt $b^2$, forming part of or attached to the castings $b$. $a^5$ represents a hole through lip $a^3$, the purpose of which will be explained farther on. At the outer or upper end of each of the cross-pieces $A^2$ is secured a casting $a^6$ of the shape shown in Fig. 7. These castings, as shown, fit over the ends of the pieces $A^2$ and have the parallel extension pieces or ears $a^7$ $a^7$ and the eye or loop $a^8$, and each of the parts $a^7$ has a hole near its outer end for the passage of a bolt or pin by which the wings are connected to the side frames. On the lower or inner end of each of the cross-pieces $c$ is secured an extension $c^2$, having the slot $c^3$ and the point $c^4$.

To secure the side frames A A' to the box in upright position for forming the hog-rack, the holes $a^4$ of the castings $a$ are slipped over the pins or bolts $b^2$, with the lower ends of the cross-pieces $A^2$ resting on the top of the posts B'. Then the wing C is connected to the frame A by inserting the slotted extension $c^2$ between the parts $a^7$ of the castings $a^6$ and the point $c^4$ is pressed down into the eye or loop $a^8$. Then the pins or bolts $d$ are passed through the holes in the parts $a^7$ and through the slot $c^3$ in the part $c^2$, thus connecting the wing C to the frame A. The other frame A' is likewise put in position. The wing C is then turned over to form the top of the hog-cage and connected to the frame A' by means of the eyed extension $c^5$ (on the upper or outer ends of the cross-pieces of the wing C) and other pins or bolts $d$. Then the end ladders E are turned up and the gates D put in place, and the hog-rack is complete. The end ladders E consist of the standards $e$ and the cross-bars $e'$. To the lower ends of the standards $e$ are secured the extensions $e^2$. These extensions each have a slot $e^3$ for the pivot $e^4$ and are provided with the point $e^5$ at the lower extremity, which point enters a slot in the bottom of the box or in a plate fastened to the box, or in an angular extension $b^x$, formed integral with the casting $b$, as shown in the drawings, Fig. 5, whereby the end ladder is held in upright position. When it is wished to turn the ladder down, it is raised enough to bring the point $e^5$ out of the slot, (which is permitted by the slot in the part $e^2$,) whereupon the ladder may be turned down either in the box or outside, as shown in Fig. 2.

D indicates additional gate-pieces, similar to the ladders E, which fit inside the standards $e$ and rest upon the bottom of the box, one of the cross-pieces $d'$ having its ends extended so as to bear against the rear faces of the standards $e$.

R R represent rods, which are passed through holes in the end cross-pieces $A^2$ of the frame A' and through the standards of the parts E and D. The one end of these rods is screw-threaded and works in a screw-threaded hole in the end cross-pieces of the frame A, thus tying the hog-rack firmly together.

$o$ represent braces for supporting the frames A A' when turned down for use as a hay-rack. These braces have in each arm thereof a slot $o'$.

$o^2$ $o^2$ represent turning hooks or catches, located, as shown, one on the outer or under side of each cross-piece $A^2$ and one on the post B' below each cross-piece $A^2$. The braces $o$ are secured to the cross-pieces $A^2$ by slipping one of the slots $o'$ over the hook on the cross-piece and then turning the hook or catch crosswise of the slot $o'$.

When it is desired to convert the hog-rack into a hay-rack, the rods R R are taken out and the gates D removed. Then the pins which connect the wing C to the frame A' are taken out and the frame A turned back on the hinge formed by the pins or bolts $b^2$ and the holes $a^4$ until the brace $o$ rests against the outer side of the posts B' and the slot in the brace fits over the corresponding hook or catch $o^2$ on the post B'. These hooks are then turned. The frame A is then likewise turned down and fastened. The wing C' is then secured to the outer ends of the cross-pieces $A^2$ by the pins or bolts $d$ and the points $c^4$ pressed down into position in the loops $a^8$.

Fig. 8 illustrates the means for tightening and strengthening the hay-rack, which consists of the hooked rods $n'$ $n^2$ and the turn-buckle $n^3$. The rod $n'$ has one end screw-threaded, which works in a screw-threaded hole $i$ in the turn-buckle. The other rod $n^2$ simply turns in the hole $j$. The hook on the rod $n'$ is inserted into the hole $a^5$ (hereinbefore referred to) in the casting $a$, and the hook on the rod $n^2$ is inserted into the hole on the casting $a$ on the opposite cross-bar $A^2$. The rack is then tightened up by turning the turn-buckle.

G represents the wagon-wheel guards. In order that they may not interfere with the use of the rack for transporting stock, the wheel-guards are made removable. The guards consist of the curved pieces $g$ $g'$, which are hinged together at $g^2$. On each of the end cross-pieces $A^2$ is secured the cup-like casting $l$, which receives the end of the piece $g$. On the next cross-piece is a similar cup $l^2$. A slot (not shown) in the part $g'$ is slipped over the turn-screw $l^2$, which screw is then turned to lock the wheel-guard in place. It will be seen that the lower or inner ends of the cross-pieces $A^2$ have a groove $a^{10}$ coincident with the holes $a^4$. The pins $b^2$ rest in the grooves when the side frames are turned down for use as a hay-rack.

One great advantage of my hay-rack is that by means of the vertical wings C and C' the hay or grain is securely held in position and one man is alone able to place on the wagon a large load of hay or grain without getting onto the wagon. If desired, the wing on the side from which the hay or grain is being pitched can be turned down while putting on the first part of the load. To do this it is only necessary to raise the points $c^4$ out of the eyes or loops $a^8$, whereupon the wing can be turned down upon the hinge formed by the pins $d$. Then after part of the load is on, the wing may be raised. These wings are specially useful in windy weather.

By having the rear end ladders E capable of turning down either way such ladder can be folded out beyond the end of the wagon and be of service in loading the hogs into the wagon.

Although I have shown the pins $d$ as split pins or keys, it is obvious that bolts and nuts could be used instead, if desired.

By having the hog-rack covered by the wing C all danger of the hogs or sheep jumping out is obviated, and should the wagon be overturned the escape of the stock would be prevented.

Having thus described my invention, what I claim, and desire to secure by Letters Patent, is—

1. In a combined hay-rack and stock-cage, the combination of a box, castings secured to said box at the ends and intermediate said ends, said castings provided with vertical pins, folding side frames, castings secured to the lower or inner ends of the cross-pieces of said side frames, said castings provided with an apertured bend and a projecting apertured lip, pivoted wings, end ladders or gates, transverse brace-rods having their inner ends screw-threaded and their outer ends hooked so as to engage the apertured lips of the bracket, and turn-buckles adapted to receive the inner threaded ends of these rods, substantially as set forth.

2. In a combined hay-rack and stock-cage, the combination of a box, castings secured to said box at the ends and intermediate said ends, said castings provided with vertical pins, folding side frames consisting of longitudinal and cross strips, the latter provided at their lower or inner ends with recesses, castings secured to said lower ends of the cross-strips, said castings provided with an apertured bend through which the vertical pin passes, said pin resting in the recess in the end of the cross-strip of the side wing when the latter occupies a horizontal position, pivoted wings, and end ladders or gates, substantially as set forth.

3. In a combined hay-rack and stock-cage, the combination of a box, folding side frames, pivoted wings, end ladders or gates consisting of side and cross strips, slotted projections extending from the lower ends of said side strips, said projections terminating in a tongue or point adapted to pass into a suitable notch and lock the gate in position, and transverse pivot-pins passing through the slot and into the frame, substantially as set forth.

4. In a combined hay-rack and stock-cage, the combination of a box, folding side frames, pivoted wings, end ladders or gates, and supplemental end ladders or gates having one of the cross-bars thereof provided with extended ends which bear against the rear of the other gates and lock said supplemental gates in position, substantially as set forth.

5. In a combined hay-rack and stock-cage, the combination of a box, castings secured to said box at the ends and intermediate the ends, said castings provided with vertical pins and also formed or provided with an angular portion having a suitable aperture, folding side frames consisting of longitudinal and cross strips, castings secured to the lower ends of the latter, said castings provided with an apertured bend adapted to engage the vertical pins, end ladders or gates consisting of side and cross strips, and slotted projections extending from the lower ends of the side pieces, said projections terminating in a tongue or point adapted to pass into the aperture of the angular extension of the castings secured to the box, substantially as set forth.

6. In a combined hay-rack and stock-cage, the combination of a box, folding side frames pivotally secured to said box, castings secured to the outer or upper ends of the cross-pieces of said frames, said brackets provided with projecting bifurcated portions having apertures, a wing consisting of longitudinal and cross strips, slotted castings secured to the lower or outer ends of the cross-pieces of the wing, transverse pins or bolts, eyed extensions secured to the upper or inner ends of the cross-pieces of the wing and passing between the bifurcated portions of the cross-pieces of the adjacent side frame, and transverse pins or bolts for locking the latter, substantially as set forth.

7. In a combined hay-rack and stock-cage, the combination of a box, folding side frames pivotally secured to said box, castings secured to the outer or upper ends of the cross-pieces of said frames, said brackets provided with projecting transversely-apertured portions and also provided with loops or eyes, a wing consisting of longitudinal and cross strips, slotted castings secured to the lower or outer ends of the cross pieces of the wing, adapted to pass between the bifurcated portions of the adjacent brackets and provided with a pointed extension passing into the loops or eyes of said adjacent brackets, transverse pins or bolts, eyed extensions secured to the upper or inner ends of the cross-pieces of the wing and passing between the bifurcated portions of the cross-pieces of the adjacent side frame, and transverse pins or bolts for locking the latter, substantially as set forth.

8. In a combined hay-rack and stock-cage, the combination of a box, folding side frames pivotally secured to said box, castings secured to the outer or upper ends of the cross-pieces of said frames, said brackets provided with projecting transversely-apertured bifurcated portions and also provided with loops or eyes, wings consisting of longitudinal and cross strips, slotted castings secured to the lower or outer ends of the cross-pieces of the wings, adapted to pass between the bifurcated portions of the adjacent brackets and provided with pointed extensions passing into the loops or eyes of said adjacent brackets, and transverse pins or bolts, substantially as set forth.

9. In a combined hay-rack and stock-cage, the combination of a box provided with suitable side pieces, hooked screws extending laterally at suitable intervals from said side pieces, folding side frames consisting of longitudinal and transverse strips, hooked screws extending laterally from said transverse strips, and brackets having their two members or arms slotted to receive said hooked screws, substantially as set forth.

In testimony that I claim the foregoing as my own I have hereunto affixed my signature in presence of two witnesses.

ERWIN J. TRACY.

Witnesses:
DANA R. BAILEY,
PERCIVAL H. EDMISON.